United States Patent
Takano

(10) Patent No.: US 9,925,873 B2
(45) Date of Patent: Mar. 27, 2018

(54) VEHICLE WARNING CONTROL APPARATUS

(71) Applicant: Toyota Jidosha Kabushiki Kaisha, Toyota-shi Aichi-ken (JP)

(72) Inventor: Masaki Takano, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/647,307

(22) Filed: Jul. 12, 2017

(65) Prior Publication Data
US 2018/0015827 A1  Jan. 18, 2018

(30) Foreign Application Priority Data
Jul. 12, 2016  (JP) .................................. 2016-137303

(51) Int. Cl.

| | |
|---|---|
| *B60Q 1/26* | (2006.01) |
| *B60K 28/06* | (2006.01) |
| *B60K 31/00* | (2006.01) |
| *B60T 17/18* | (2006.01) |
| *B60T 8/172* | (2006.01) |
| *B60T 8/1763* | (2006.01) |
| *G08G 1/16* | (2006.01) |
| *B60Q 1/00* | (2006.01) |
| *B60R 21/00* | (2006.01) |
| *B60W 50/14* | (2012.01) |

(52) U.S. Cl.
CPC ........ *B60K 28/066* (2013.01); *B60K 31/0008* (2013.01); *B60T 8/172* (2013.01); *B60T 8/1763* (2013.01); *B60T 17/18* (2013.01); *G08G 1/16* (2013.01); *B60K 31/00* (2013.01); *B60Q 1/00* (2013.01); *B60R 21/00* (2013.01); *B60W 2050/143* (2013.01); *B60W 2550/148* (2013.01)

(58) Field of Classification Search
None
See application file for complete search history.

(56) References Cited

U.S. PATENT DOCUMENTS

| | | | |
|---|---|---|---|
| 7,057,517 B1 * | 6/2006 | Convery .................. | G08B 7/06 340/286.02 |
| 2017/0232973 A1 | 8/2017 | Otake | |

FOREIGN PATENT DOCUMENTS

| | | | |
|---|---|---|---|
| JP | 2000-253729 | * | 9/2000 |
| JP | 2009-073462 |  | 4/2009 |

* cited by examiner

*Primary Examiner* — Julie Lieu
(74) *Attorney, Agent, or Firm* — Dinsmore & Shohl LLP

(57) ABSTRACT

When a driving support electronic control unit (DSECU) determines that a driver of a vehicle is in an abnormal state where the driver loses an ability to drive the vehicle, the DSECU starts driving control under the abnormal state to decelerate the vehicle until the vehicle stops and to sound a horn. In this case, the DSECU measures an elapsed time since the horn starts sounding with a horn timer th, and sets a sounding pattern corresponding to the elapsed time measured. This sounding pattern is set in such a manner that a ratio of a sounding time of the horn per unit time decreases as the elapsed time since the horn starts sounding become longer. Thereby, it becomes possible to properly notify that the driver is in the abnormal state using the horn.

10 Claims, 10 Drawing Sheets

FIG.10

| VEHICLE SPEED SPD | SOUNDING PATTERN |
|---|---|
| SPD>SPD2 | PATTERN 1 |
| SPD1<SPD≦SPD2 | PATTERN 2 |
| 0<SPD≦SPD1 | PATTERN 3 |
| SPD=0 | PATTERN 4 |

FIG.11

| VEHICLE SPEED SPD | SOUNDING PATTERN |
|---|---|
| SPD>0 | PATTERN 1 |
| SPD=0 | PATTERN 4 |

US 9,925,873 B2

VEHICLE WARNING CONTROL APPARATUS

CROSS-REFERENCE TO RELATED APPLICATIONS

This application claims priority to Japanese Patent application No. 2016-137303 filed Jul. 12, 2016, which is incorporated herein by reference in its entirety including the specification, drawings, and abstract.

TECHNICAL FIELD

The present disclosure relates to a vehicle warning control apparatus for sounding a horn of a vehicle when a drive has fallen into an abnormal state in which the driver loses an ability to drive the vehicle.

BACKGROUND ART

An apparatus has conventionally been proposed which determines whether or not a driver has fallen into an abnormal state where the driver loses an ability to drive a vehicle (for example, a drowsy driving state, a mental and physical failure state, and the like), and decelerates the vehicle when the driver is determined to be in such an abnormal state (for example, refer to Japanese Patent Application Laid-Open (kokai) No. 2009-73462.).

It should be noted that hereinafter an "abnormal state where a driver loses an ability to drive a vehicle" is simply also referred to as an "abnormal state". Besides, a vehicle which a driver who is in the abnormal state is in is also referred to as an "own vehicle".

SUMMARY

When the driver has fallen into the abnormal state, one possible measure to be taken is to notify surrounding people of some abnormality has occurred by sounding a horn which is an alarm. By notifying in this way, it becomes possible to evacuate surrounding people and other vehicles from the traveling vehicle, and to rescue the driver in the abnormal state after the vehicle stops.

However, when a general horn used for vehicles are sounded for a long period of time, there is a possibility that the horn melts due to heat generation of internal parts and eventually becomes incapable of sounding. If surrounding people immediately notice the sound of the horn, the driver can be rescued early. However, for example, in a case where the driver falls into the abnormal state while driving on a quiet road and the vehicle stops, there is a possibility that nobody passes by near the stopped vehicle for a long period of time. In such a case, there is a possibility that the horn stops sounding before some pedestrian or other vehicle passes by near the vehicle.

In this case, it becomes impossible to notify surrounding people of the driver being in the abnormal state by sounding the horn, and therefore a rescue timing of the driver will be delayed.

The present disclosure is made in order to resolve the problem above. That is, one of objects of the present disclosure is to properly notify that the driver is in the abnormal state by using the horn.

In order to achieve the object above, one feature of a vehicle warning control apparatus of the present disclosure lies in that the vehicle warning control apparatus comprises;

abnormality determination information acquisition means (10, S11-S16) for acquiring an abnormality determination information showing a determination result of whether or not a driver of a vehicle is in an abnormal state where the driver loses an ability to drive the vehicle; and horn sounding control means (10, 90, 92) for intermittently sounding a horn which is an alarm of the vehicle based on a determination result that the driver is in the abnormal state (S11: No), wherein, the horn sounding control means is configured to control (S18-S20) sounding of the horn in such a manner that a ratio of a sounding time of the horn per unit time decreases with a time elapsed since the horn starts sounding.

In the present disclosure, the abnormality determination information acquisition means acquires the abnormality determination information showing the determination result of whether or not the driver of the vehicle is in the abnormal state where the driver loses the ability to drive the vehicle. In this case, the abnormality determination information acquisition means may acquire the determination result of whether or not the driver is in the abnormal state from an external abnormality determination device. Alternatively, the abnormality determination information acquisition means may continuously perform the determination of whether or not the driver is in the abnormal state, and acquire the abnormality determination information showing the determination result.

As described later, a determination of whether or not the driver is in the abnormal state (hereinafter, this determination is referred to as an "abnormality determination") can be made by means of various methods. For example, the abnormality determination can be made by determining whether or not a state in which the driver does not conduct any operation to drive the vehicle (a state-with-no-driving-operation) continues for more than or equal to a threshold time (a threshold time for the abnormality determination of the driver), or by determining whether or not a state in which the driver does not push a confirmation button even when the driver is urged to push the confirmation button continues for more than or equal to a threshold time, and so on. Alternatively, the abnormality determination can be made by using a so called "driver monitor technique" disclosed in Japanese Patent Application Laid-Open (kokai) No. 2013-152700 and so on.

The horn sounding control means intermittently sounds (honks) the horn which is the alarm of the vehicle based on the determination result that the driver is in the abnormal state. "Sounding the horn intermittently" means that operating the horn in such a manner that a period during which the horn is sounded and a period during which the horn is not sounded both exist.

In general, a horn provided at a vehicle raises a warning sound toward outside of the vehicle by vibrating a vibrating member which is a sound source with electric power supplied by a battery. In the present specification, raising a warning sound with the horn is referred to as "sounding". When such a horn is sounded for a long period of time, internal parts thereof generate heat, and the horn eventually becomes incapable of sounding owing to exceeding a tolerance limit by the heat generation.

When the horn stops sounding owing to exceeding the tolerance limit thereof, it becomes impossible to notify of the driver's abnormal state using the horn. Therefore, in the present disclosure, the horn sounding control means controls sounding of the horn in such a manner that a ratio of a sounding time of the horn per unit time decreases with a time elapsed since the horn starts sounding. "The ratio of the sounding time of the horn per unit time" can be also expressed as a "ratio of a time t1 during which the horn is sounded to a total time of the time t1 during which the horn is sounded and a time t2 during which the horn is not sounded (t1+t2), that is, t1/(t1−t2)".

When the driver's abnormal state has been detected, it is required to notify surrounding people of the abnormality occurrence as soon as possible. Therefore, the horn sounding control means sets the ratio of the sounding time of the horn per unit time to be a high ratio at an early stage of the detection of the abnormal state, and notifies surrounding people of the abnormality occurrence.

If somebody exists in a region where sounding of the horn can be heard, he/she is notified that some abnormality has occurred in the vehicle, and the driver can be rescued. However, people may not be always in the region where the sounding of the horn can be heard. Therefore, the sounding of the horn needs to be continued until the driver is rescued. On the other hand, the horn becomes incapable of sounding due to the heat generation when the horn is sounded for a long period of time.

Therefore, the horn sounding control means decreases a ratio of a sounding time of the horn per unit time with a time elapsed since the horn starts sounding. Accordingly, the heat generation of the horn is suppressed (that is, a cooling period of the horn is increased), and as a result, it becomes possible that the horn does not reach the tolerance limit. Hence, notification with the horn can be continued for a long period of time.

As a result, according to the present disclosure, it becomes possible to properly notify that the driver is in the abnormal state by using the horn. Accordingly, a rescue ratio of the driver can be increased.

One feature of another aspect of the present disclosure lies in that;

the horn sounding control means is configured to measure (S18) an elapsed time since the horn starts sounding, and to decrease (S19) the ratio of the sounding time of the horn per unit time as the elapsed time measured increases.

According to another aspect of the present disclosure, the elapsed time since the horn starts sounding is measured, and as the elapsed time measured increases, the ratio of the sounding time of the horn per unit time decreases. Therefore, the ratio of the sounding time of the horn per unit time can be set properly. For example, when the elapsed time is less than a predetermined set time, the ratio of the sounding time of the horn per unit time is set to a first ratio, and when the elapsed time becomes more than or equal to the set time above, the ratio of the sounding time of the horn per unit time is set to a second ratio less than the first ratio.

One feature of another aspect of the present disclosure lies in that;

a vehicle warning control apparatus further comprises decelerating control means (10, S17, 30, 40) for decelerating the vehicle based on a determination result that the driver is in the abnormal state, wherein, the horn sounding control means is configured to acquire (S181) a vehicle speed of the vehicle, and to decrease (S191) the ratio of the sounding time of the horn per unit time as the vehicle speed acquired decreases.

In another aspect of the present disclosure, the vehicle warning control apparatus is applied to a vehicle configured to control a vehicle speed in such a manner that the vehicle speed decreases based on a determination result that the driver is in the abnormal state. In this case, the horn sounding control means acquires the vehicle speed, and as the vehicle speed acquired decreases, the ratio of the sounding time of the horn per unit time decreases. Therefore, the ratio of the sounding time of the horn per unit time can be set properly. For example, when the vehicle speed is greater than a predetermined set vehicle speed, the ratio of the sounding time of the horn per unit time is set to a first ratio, and when the vehicle speed becomes less than or equal to the set vehicle speed above, the ratio of the sounding time of the horn per unit time is set to a second ratio less than the first ratio.

One feature of another aspect of the present disclosure lies in that;

the decelerating control means is configured to decelerate the vehicle until the vehicle stops, and the horn sounding control means is configured to decrease the ratio of the sounding time of the horn per unit time more when the vehicle stops in comparison with when the vehicle travels while decelerating.

In another aspect of the present disclosure, the vehicle warning control apparatus is applied to a vehicle configured to perform a decelerating control until the vehicle speed decreases to zero. In another aspect of the present disclosure, when the vehicle stops, the ratio of the sounding time of the horn per unit time decreases more in comparison with when the vehicle travels while decelerating. Therefore, during the vehicle traveling while decelerating, a stronger warning can be raised to surrounding people, whereas during stoppage of the vehicle, the notification that some abnormality has occurred can be continued for a long period of time.

One feature of another aspect of the present disclosure lies in that;

the horn sounding control means is configured to;
control sounding of the horn in such a manner that an intermittent sounding period during which the horn is intermittently sounded and a non-operating period during which the horn is not sounded switch alternately, and decrease a ratio of the intermittent sounding period with the time elapsed.

According to another aspect of the present disclosure, the sounding of the horn is controlled in such a manner that the intermittent sounding period during which the horn is intermittently sounded and the non-operating period during which the horn is not sounded switch alternately. In this case, the ratio of the intermittent sounding period decreases as the time elapses since the horn starts sounding. Therefore, the ratio of the sounding time of the horn per unit time can be set properly. For example, the horn sounding control means decreases the number of sounding the horn in each intermittent sounding period, or prolongs each non-operating period.

In the above description, references used in the following descriptions regarding embodiments are added with parentheses to the elements of the present disclosure, in order to assist in understanding the present disclosure. However, those references should not be used to limit the scope of the disclosure.

BRIEF DESCRIPTION OF THE DRAWINGS

FIG. 10 is a description diagram showing a pattern switch map using the vehicle speed.

FIG. 11 is a description diagram showing a modification example of the pattern switch map using the vehicle speed.

DESCRIPTION OF THE EMBODIMENT

A driving support apparatus comprising a vehicle warning control apparatus according to an embodiment of the present disclosure will be described below, referring to figures.

Figure 1:
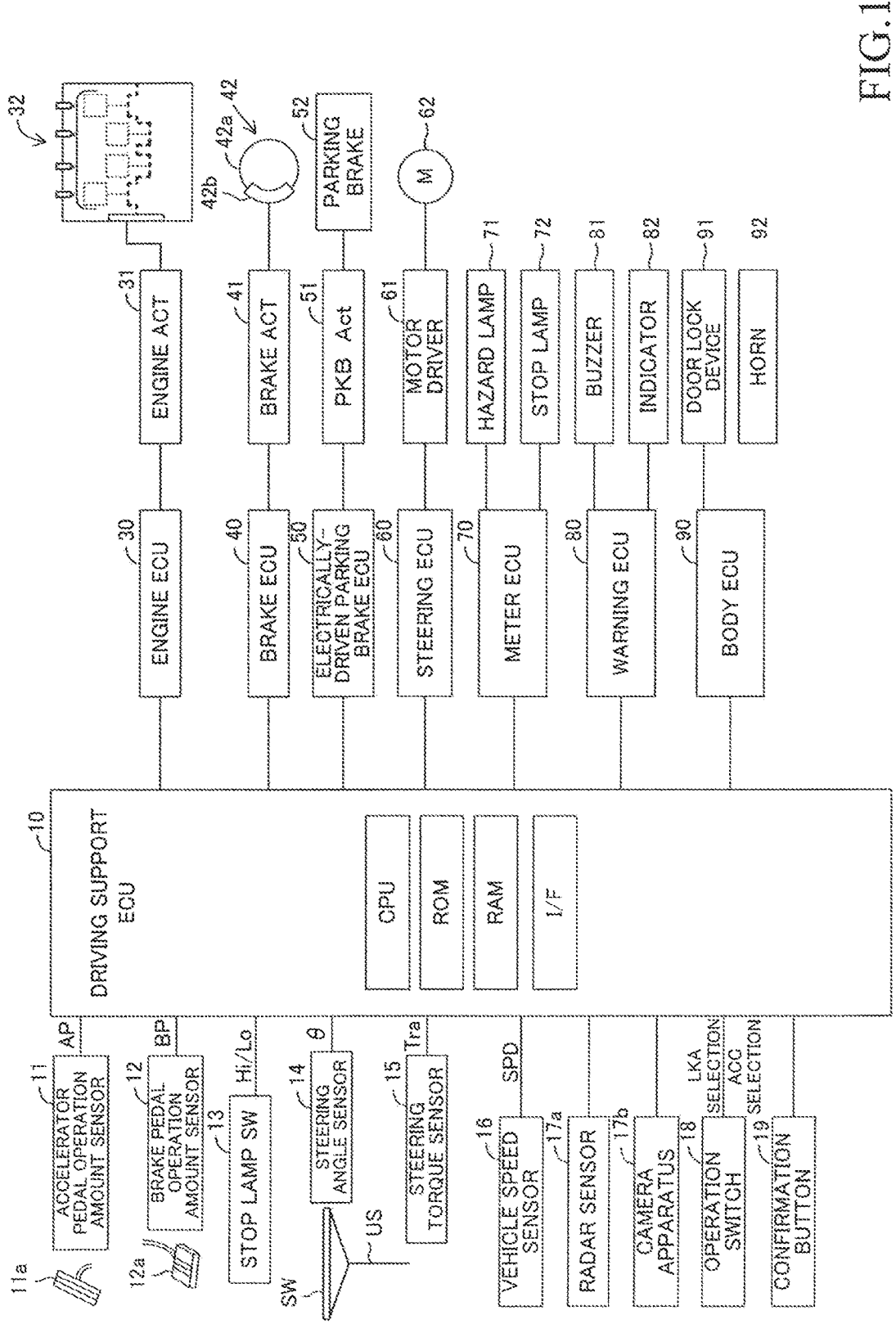
FIG. 1 is a schematic configuration diagram of a driving support apparatus comprising a vehicle warning control apparatus according to an embodiment of the present disclosure.

The driving support apparatus comprising the vehicle warning control apparatus according to the embodiment of the present disclosure is, as shown in FIG. 1, applied to a vehicle (hereinafter, may be referred to as an "own vehicle" in order to distinguish it from other vehicles), and comprises a driving support ECU 10, an engine ECU 30, a brake ECU 40, an electrically-driven parking brake ECU 50, a steering ECU 60, a meter ECU 70, a warning ECU 80, and a body ECU 90. Hereinafter, the driving support ECU 10 will be referred to as a "DSECU 10".

Each of the ECUs is an electric control unit comprising a microcomputer as a main part. Those ECUs are connected via CAN (Controller Area Network) which is not illustrated so that the ECUs are capable of mutually transmitting and receiving information. In the present specification, the microcomputer includes CPU, ROM, RAM, a non-volatile memory, an interface I/F, or the like. The CPU is configured to realize/perform various functions by executing instructions (i.e., programs or routines) stored in the ROM. Some of those ECUs or all of those ECUs may be integrated into one ECU.

The DSECU 10 is connected to sensors (including switches) listed below, and is configured to receive a detection signal or an output signal of these sensors. It should be noted that each sensor may be connected to ECUs other than the DSECU 10. In this case, the DSECU 10 receives the detection signal or the output signal of the sensor via CAN from the ECU to which the sensor is connected.

An accelerator pedal operation amount sensor 11 is configured to detect an operation amount (an accelerator position) of an accelerator pedal 11a of the own vehicle, and to output a signal representing the accelerator pedal operation amount AP.

A brake pedal operation amount sensor 12 is configured to detect an operation amount of a brake pedal 12a of the own vehicle, and to output a signal representing the brake pedal operation amount BP.

A stop lamp switch 13 is configured to output a low level signal when the brake pedal 12a is not being depressed (is not being operated), and to output a high level signal when the brake pedal 12a is being depressed (is being operated).

A steering angle sensor 14 is configured to detect a steering angle of the own vehicle, and to output a signal representing the steering angle θ.

A steering torque sensor 15 is configured to detect a steering torque added to a steering shaft US of the own vehicle by an operation of a steering wheel SW, and to output a signal representing the steering torque Tra.

A vehicle speed sensor 16 is configured to detect a traveling speed (a vehicle speed) of the own vehicle, and to output a signal representing the vehicle speed SPD.

A radar sensor 17a is configured to obtain information regarding a road ahead of the own vehicle, and a three-dimensional object present in the road. The three-dimensional object includes, for example, moving objects such as a pedestrian, a bicycle and an automobile, and static objects such as a power pole, a tree, and a guardrail. Hereinafter, these three-dimensional objects may be referred to as a "target object."

The radar sensor 17a comprises a "radar transmission/reception part and a signal processor", both of which are not illustrated.

The radar transmission/reception part emits an electric wave in a millimeter waveband (hereinafter, referred to as a "millimeter wave") to an ambient region of the own vehicle including a front region of the own vehicle, and receives a millimeter wave (i.e., a reflected wave) reflected from a target object which is present in the emitted area.

The signal processor obtains, every predetermined period of time, an inter-vehicle distance (a longitudinal distance), a relative speed, a lateral distance, a relative lateral speed, and the like, with respect to each detected target object based on a phase difference between the transmitted millimeter wave and the received reflected wave, an attenuation level of the reflected wave, a time from a point in time of transmitting the millimeter wave to a point in time of receiving the reflected wave, or the like.

A camera apparatus 17b comprises a "stereo camera and an image processor", both of which are not illustrated.

The stereo camera photographs/captures landscapes of a left-side region and a right-side region in front of the own vehicle to obtain a left-and-right pair of image data.

The image processor is configured to calculate information as to whether or not a target object is present, a relative relationship between the own vehicle and the target object and the like, based on the left-and-right pair of image data photographed/captured by the stereo camera to output them.

It should be noted that the DSECU 10 is configured to determine a relative relationship (target object information) between the own vehicle and the target object by composing the relative relationship between the own vehicle and the target object obtained by the radar sensor 17a and the relative relationship between the own vehicle and the target object obtained by the camera apparatus 17b. Further, the DSECU 10 is configured to recognize a lane marker such as a left white line and a right white line of a road (hereinafter, simply referred to as a "white line") based on the left-and-right pair of image data (road image data) photographed/captured by the camera apparatus 17b and to obtain a shape of the road (a curvature radius representing a degree of how much the road is curved), a positional relationship between the road and the own vehicle, and the like. In addition, the DSECU 10 is configured to also obtain the information whether or not a road side wall exists based on the image data photographed/captured by the camera apparatus 17b.

An operation switch 18 is a switch to be operated by a driver. The driver can select whether or not to perform a traffic lane keeping control (LKA: Lane Keeping Assist control) by operating the operation switch 18. Moreover, the driver can select whether or not to perform a trailing inter-vehicle distance control (ACC: Adaptive Cruise Control) by operating the operation switch 18.

A confirmation button 19 is arranged at a position capable of being operated by the driver. The confirmation button 19 is configured to output a low-level signal when not being operated and to output a high-level signal when being pressed.

The DSECU 10 is configured to perform the LKA and the ACC. Further, as described later, the DSECU 10 is configured to determine whether or not the driver is in an abnormal state in which the driver loses an ability to drive the vehicle, and to perform various types of control to perform appropriate processes when the driver is determined to be in the abnormal state.

The engine ECU 30 is connected to an engine actuator 31. The engine actuator 31 includes actuators for changing a driving state of an internal combustion engine 32. In the present embodiment, the internal combustion engine 32 is a gasoline fuel injection, spark ignition, multi-cylinder engine, and comprises a throttle valve to adjust an intake air amount. The engine actuator 31 includes at least a throttle valve actuator to change an opening degree of the throttle valve. The engine ECU 30 can change torque which the internal combustion engine 32 generates by driving the engine actuator 31. The torque which the internal combustion engine 32 generates is transmitted to a non-illustrated driving wheels via a non-illustrated transmission gear. Therefore, the engine ECU 30 can control the engine actuator 31 to control a driving force of the own vehicle, so as to change an acceleration state (an acceleration rate).

The brake ECU 40 is connected to a brake actuator 41. The brake actuator 41 is provided in a hydraulic circuit between a non-illustrated master cylinder to compress operating fluid with a depression force of the brake pedal and friction brake mechanisms 42 provided at left-and-right-front wheels and left-and-right-rear wheels. Each of the friction brake mechanisms 42 comprises a brake disc 42a fixed to the wheel and a brake caliper 42b fixed to a vehicle body. The brake actuator 41 adjusts, in response to an instruction from the brake ECU 40, a hydraulic pressure that is supplied to a wheel cylinder which is built in the brake caliper 42, and operates the wheel cylinder with the hydraulic pressure. Thereby, the brake actuator 41 presses a brake pad onto the brake disc 42a to generate a friction braking force. Accordingly, the brake ECU 40 can control the braking force of the own vehicle by controlling the brake actuator 41.

The electrically-driven parking brake ECU (hereinafter, may be referred to as an "EPB ECU") 50 is connected to a parking brake actuator (hereinafter, may be referred to as a "PKB actuator") 51. The PKB actuator 51 is an actuator for pressing the brake pad onto the brake disc 42a or for, in a case when comprising a drum brake, pressing a shoe onto a drum rotating with the wheel. Therefore, EPB ECU 50 can add a parking brake force to the wheel by use of the PKB actuator 51 to maintain the vehicle in a stopped state.

The steering ECU 60 is a control apparatus of a well-known electrically-driven power steering system and is connected to a motor driver 61. The motor driver 61 is connected to a steering motor 62. The steering motor 62 is incorporated into a non-illustrated "steering mechanism including the steering wheel, the steering shaft coupled to the steering wheel, a gear mechanism for steering, and the like" of the vehicle. The steering motor 62 generates torque with electric power supplied from the motor driver 61 to be able to add a steering assist torque using the torque, or to turn left-and-right steered wheels.

The meter ECU 70 is connected to a non-illustrated digital indication type meter and is also connected to a hazard lamp 71 and a stop lamp 72. The meter ECU 70 can, in response to an instruction from the DSECU 10, blink the hazard lamp 71 and light the stop lamp 72.

The warning ECU 80 is connected to a buzzer 81 and an indicator 82. The warning ECU 80 can, in response to an instruction from the DSECU 10, sound the buzzer 81 to alert the driver, light a mark for alerting (for example, a warning lamp) on the indicator 82, display a warning message on the indicator 82, and display an operating state of a driving support control on the indicator 82.

The body ECU 90 is connected to a door lock device 91 and a horn 92. The body ECU 90 can unlock the door lock device 91 in response to an instruction from the DSECU 10. In addition, the body ECU 90 can sound the horn 92 in response to an instruction from the DSECU 10.

The horn 92 is a general alarm used for vehicles activated with electric power supplied by an on-vehicle battery. For example, the horn 92 comprises a spiral-shaped sound tube, a vibrating member which is provided at a start position of the sound tube and is a sound source generating a vibrating wave, and an electric actuator vibrating the vibrating member.

<Summary of the Control Processes>

Next, control processes performed by the DSECU 10 will be explained. The DSECU 10 continuously determines whether or not the driver is in the "abnormal state where the driver loses the ability to drive the vehicle (hereinafter, simply referred to as the "abnormal state")" during the vehicle traveling. The determination of whether or not the driver is in the abnormal state will be described later.

The DSECU 10 starts a driving control under the abnormal state when the DSECU 10 detects the driver's abnormal state. The driving controls under the abnormal state are, for example, a decelerating stop control to decelerate the own vehicle until the vehicle speed decreases to zero, LKA (traffic lane keeping control) to make the own vehicle travel along a lane, and ACC (trailing inter-vehicle distance control) to control an inter-vehicle distance between a preceding vehicle and the own vehicle, and so on. It should be noted that under a normal state, the ACC controls acceleration and deceleration of the own vehicle so that the own vehicle trails the preceding vehicle, however, when the driver's abnormal state is detected, only a function to decelerate the own vehicle so that the inter-vehicle distance between the preceding vehicle and the own vehicle does not become less than a permissible distance is activated, and a function to trail the preceding vehicle is stopped.

When performing the decelerating stop control, the DSECU 10 calculates an acceleration of the own vehicle from a change amount of the vehicle speed SPD per unit time obtained based on the signal from the vehicle speed sensor 16, and outputs to the engine ECU 30 and the brake ECU 40 an instruction signal for matching the acceleration thereof with the target deceleration $\alpha$. Accordingly, the own vehicle can be decelerated at the constant target deceleration $\alpha$.

In addition, when the DSECU 10 performs the LKA, the DSECU 10 recognizes (obtains) "the left white line LL and the right white line LR" of the lane on which the own vehicle is traveling based on the image data transmitted from the camera apparatus 17b and determines a central position of a pair of these white lines to be a target traveling line Ld. In addition, the DSECU 10 calculates a curve radius (a curvature radius) R of the target traveling line Ld, and a position and a direction of the own vehicle in a traveling line defined by the left white line LL and the right white line LR. Then, the DSECU 10 calculates a distance Dc (hereinafter, referred to as a "center distance Dc") in a width direction of a road between a central position of a front end of the own vehicle and the target traveling line Ld, and a deviation angle θy (hereinafter, referred to as a "yaw angle θy") between a direction of the target traveling line Ld and the traveling direction of the own vehicle.

Further, the DSECU 10 calculates a target steering angle θ* using the following formula (1) based on the center distance Dc, the yaw angle θy, and a road curvature v (=1/curvature radius R) every time a predetermined calculation interval elapses. In the formula (1), K1, K2 and K3 are control gains. The target steering angle θ* is a steering angle set so that the own vehicle can travel along the target traveling line Ld.

$$\theta^* = K1 \times v + K2 \times \theta y + K3 \times Dc \qquad (1)$$

The DSECU 10 outputs an instruction signal representing this target steering angle θ* to the steering ECU 60. The steering ECU 60 drives and controls the steering motor 62 so that the steering angle θ matches (coincides with) the target steering angle θ*. Accordingly, the own vehicle travels along the target traveling line Ld.

Besides, when the DSECU 10 uses the ACC to decelerate the own vehicle so that the inter-vehicle distance between the preceding vehicle and the own vehicle does not become less than the permissible distance, the DSECU 10 calculates the inter-vehicle distance between the preceding vehicle and the own vehicle and the relative speed between the own vehicle and the preceding vehicle (that is, an approaching speed) by means of the radar sensor 17a or the camera apparatus 17b. Thereafter, the DSECU 10 calculates a time TTC based on the inter-vehicle distance and the approaching speed, the time TTC is a time required for the own vehicle to collide with the preceding vehicle. The DSECU 10 calculates a deceleration (hereinafter, referred to as an "ACC deceleration") corresponding to the time TTC. The ACC deceleration is set so that an absolute value of thereof becomes greater as the time TTC becomes shorter. Accordingly, the ACC deceleration at which the inter-vehicle distance between the preceding vehicle and the own vehicle does not become less than the permissible distance can be calculated. The DSECU 10 decelerates the own vehicle using a deceleration with a greater absolute value among the target deceleration a determined by the decelerating stop control and the ACC deceleration. Accordingly, the own vehicle can be prevented from colliding with the preceding vehicle.

It should be noted that when performing the driving control under the abnormal state, the DSECU 10 forcibly performs the aforementioned control even though performances of the LKA and the ACC are not selected by the operation switch 18.

In addition, the DSECU 10 outputs a no-driving-operation warning instruction to the warning ECU 80 during the own vehicle traveling while decelerating by the driving control under the abnormal state. Accordingly, the warning ECU 80 raises a warning sound from the buzzer 81, blinks a warning lamp on the indicator 82, and displays a warning message urging the driver to operate any one of "the accelerator pedal 11a, the brake pedal 12a, and the steering wheel SW".

Besides, when the DSECU 10 starts decelerating the own vehicle by the driving control under the abnormal state, the DSECU 10 outputs a sounding instruction of the horn 92 to the body ECU 90 as well as a lighting instruction of the stop lamp 72 and a blinking instruction of the hazard lamp 71 to the meter ECU 70. Accordingly, the horn 92 starts sounding intermittently, the stop lamp 72 starts lighting, and the hazard lamp 71 starts blinking.

Further, when the own vehicle stops, the DSECU 10 outputs an actuation instruction of the electrically-driven parking brake to the electrically-driven parking brake ECU 50 and an unlock instruction of the door lock device 91 to the body ECU 90. Accordingly, the electrically-driven parking brake is brought into an actuation state, and the door lock device 91 is brought into an unlock state. It should be noted that the blinking of the hazard lamp 71 and the sounding of the horn 92 are continued also after the vehicle has stopped.

The DSECU 10 stores a plurality types of sounding patterns which are patterns to sound the horn 92 intermittently, and selects one sounding pattern based on the elapsed time since the horn 92 starts sounding or the vehicle speed SPD. The DSECU 10 outputs the sounding instruction to the body ECU 90 in accordance with the selected sounding pattern. Such a control to switch the sounding pattern of the horn 92 is referred to as a horn sounding control.

There is a case that when the horn 92 is sounded for a long period of time, heat is generated in the electric actuator, causing internal parts thereof to melt, and eventually the horn 92 becomes incapable of sounding. For example, in one type of horn in which a movable iron core is moved back and forth by switching electric conduction of a coil on and off alternately, and a vibrating member is vibrated by the back-and-forth motion of the movable iron core, contact members generate heat by repeating discharge between the contact members which switch electric conduction of the coil on and off. Therefore, when the horn 92 is sounded for a long period of time, the contact members melt and the horn 92 becomes incapable of sounding. Hence, the horn 92 has a tolerance limit due to heat generation.

When performing the horn sounding control, the sounding pattern of the horn 92 is set, taking the tolerance limit of the horn 92 into consideration. It should be noted that the horn 92 is not limited to a horn which has contact members mentioned above, but other horns without contact members may be used as long as they reach their tolerance limits by generating heat.

<Driver Abnormality Notification Control Routine>

Figure 2:
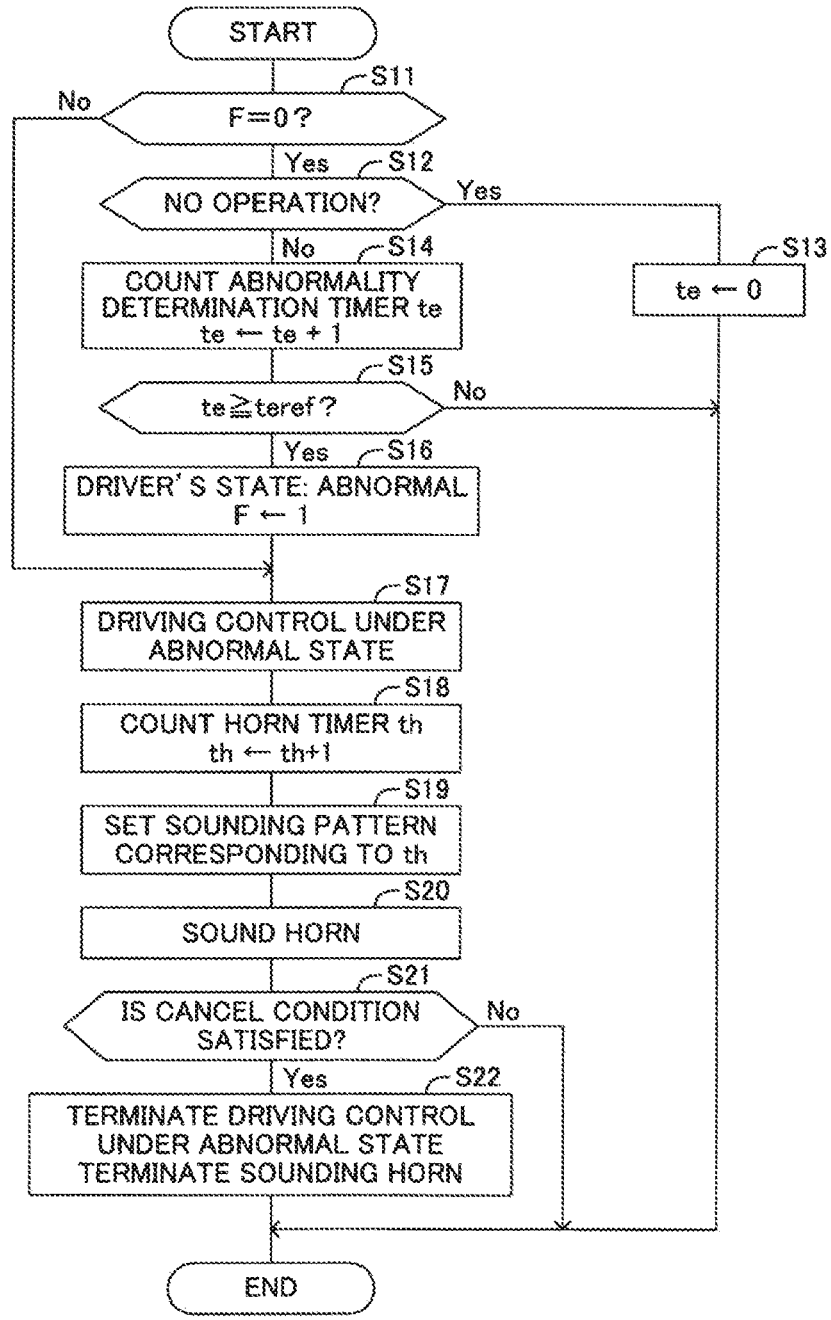
FIG. 2 is a flowchart showing a driver abnormality notification control routine.

Next, the driver abnormality notification control performed by the DSECU 10 will be explained. FIG. 2 shows a driver abnormality notification control routine performed by the DSECU 10. When an ignition switch is turned on, the DSECU 10 repeatedly performs the driver abnormality notification control routine every time the predetermined calculation interval elapses. The driver abnormality notification control routine includes an abnormality determination process to determine whether or not the driver is in the abnormal state, the aforementioned driving control under the abnormal state, and the horn sounding control.

When the driver abnormality notification control routine is activated, the DSECU 10 determines, at a step S11, whether or not an abnormality determination flag F is "0". The abnormality determination flag F shows a determination result of whether or not the driver at the current time is in the abnormal state. The value of the abnormality determination flag F being "0" means that the driver's state is not "abnormal", and the value of the abnormality determination flag F being "1" means that the driver's state is "abnormal".

At a point when the ignition key is turned on, the abnormality determination flag F is initialized to be set to "0" (F=0). Therefore, the DSECU 10 makes an "Yes" determination at the step S11 immediately after the present routine is activated since the abnormality determination flag F has been initialized. In this case, the DSECU 10 proceeds to a step S12 to determine whether or not a state is in a state where the driver does not perform any driving operation (a state-with-no-driving-operation).

The state-with-no-driving-operation is a state where any of parameters consisting of one or more combinations of "the accelerator pedal operation amount AP, the brake pedal operation amount BP, the steering torque Tra, and a signal level of the stop lamp switch 13" which vary depending on an operation by the driver does not change while the vehicle is traveling. In the present embodiment, the DSECU 10 regards a following state as the state-with-no-driving-operation where the vehicle speed SPD is more than or equal to the abnormality determination permission vehicle speed SPD0, any of "the accelerator pedal operation amount AP, the brake pedal operation amount BP, and the steering torque Tra" does not change, and the steering torques remains "0".

When the current state is not the state-with-no-driving-operation (S12: Yes), the DSECU 10 clears, at a step S13, a value of an abnormality determination timer te to zero, and tentatively terminates the driver abnormality notification control routine. The value of the abnormality determination timer te is set to "0" when the ignition switch is turned on.

As a result of repeating the processes stated above, when the state-with-no-driving-operation is detected, the DSECU 10 increases the value of the abnormality determination timer te by "1" at a step S14. Therefore, the value of the abnormality determination timer te represents a duration time of the state-with-no-driving-operation.

Subsequently, the DSECU 10 determines, at a step S15, whether or not the value of the abnormality determination timer te is more than or equal to an abnormality confirmation time teref set in advance. When the duration time of the state-with-no-driving-operation is less than the abnormality confirmation time teref (S15: No), the DSECU 10 tentatively terminates the driver abnormality notification control routine.

When some driving operation by the driver is detected (S12: Yes) in the midst of repeating the processes stated above, the DSECU 10 clears the value of the abnormality determination timer te to zero at the step S13.

On the other hand, when the value of the abnormality determination timer te reaches the abnormality confirmation time teref (S15: Yes) without any driving operation by the driver being detected, the DSECU 10 determines a state is the abnormal state where the driver loses the ability to driver the vehicle, and proceeds to a step S16 to set the value of the abnormality determination flag F to "1". Thereafter, the DSECU 10 proceeds to a step S17. After the abnormality determination flag F is set to "1", the DSECU 10 makes a "No" determination at the step S11 in the driver abnormality notification control routine. Therefore, the aforementioned processes from the step S12 to the step S16 will be skipped.

The DSECU 10 performs the driving control under the abnormal state at the step S17. That is, the DSECU 10 performs the aforementioned decelerating stop control, the LKA, and the ACC (decelerating alone). Accordingly, the own vehicle is decelerated so that the own vehicle stops. At the same time, the DSECU 10 starts warning to the driver, lighting of the stop lamp 72, and blinking of the hazard lamp 71. In addition, the DSECU 10 performs the sounding control of the horn 92 as described below.

The DSECU 10 increases, at a subsequent step S18, a value of a horn timer th by "1". The value of the horn timer th is set to "0" when the ignition switch is turned on. Next, the DSECU 10 sets, at a step S19, a sounding pattern corresponding to the value of the horn timer th, and outputs, at a step S20, the sounding instruction of the horn 92 to the body ECU 90 in accordance with the set sounding pattern.

Figure 3:
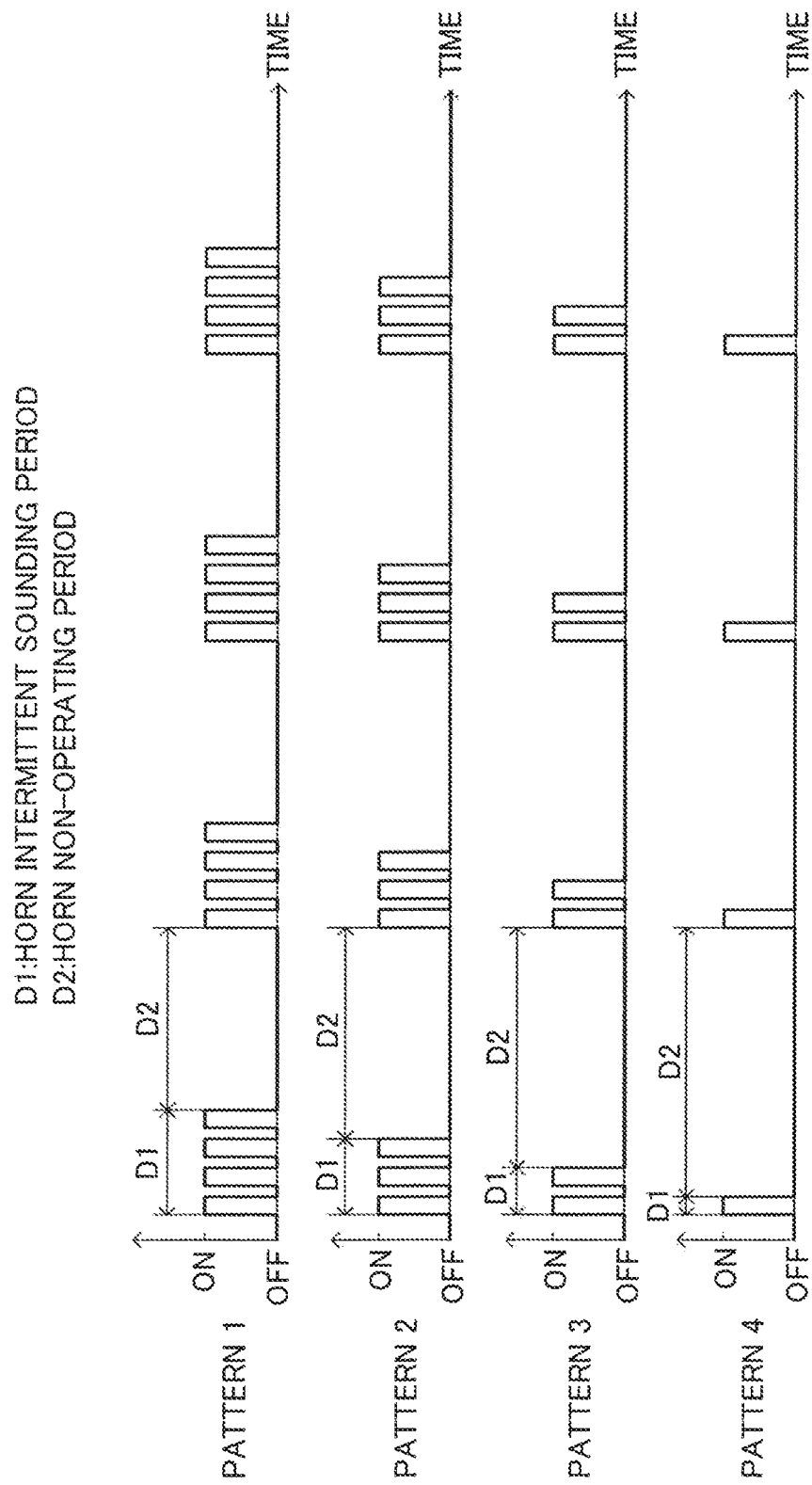
FIG. 3 is a graph showing a notification pattern.

FIG. 3 shows one example of the sounding pattern. In this sounding pattern, a pattern to sound the horn 92 is set in such a manner that a horn intermittent sounding period D1 and a horn non-operating period D2 switch alternately. In FIG. 3, "ON" represents that the horn 92 sounds, and "OFF" represents that the horn 92 does not sound (that is, the horn 92 is not operated). In the horn intermittent sounding period D1, the sounding and the non-operating of the horn 92 are repeated alternately at a predetermined interval, and in the horn non-operating period D2, the non-operating of the horn 92 is maintained.

In this example, the number of sounding of the horn 92 in the horn intermittent sounding period D1 is four times in a pattern 1, three times in a pattern 3, twice in a pattern 3, and one in a pattern 4. One cycle of a horn sounding pattern is composed of one horn intermittent sounding period D1 and one horn non-operating period D2. A time of this one cycle (D1+D2) remains unchanged among the patterns 1 to 4. In addition, one sounding time of the horn 92 during the horn intermittent sounding period D1 (a width of one pulse waveform in FIG. 3) remains also unchanged among the patterns 1 to 4. Therefore, the ratio of the sounding time of the horn 92 per unit time is the largest in the pattern 1, and becomes smaller in the order of the pattern 2, the pattern 3, and the pattern 4. It should be noted that various types of sounding patterns can be set, which will be described later as modification examples.

Figure 4:
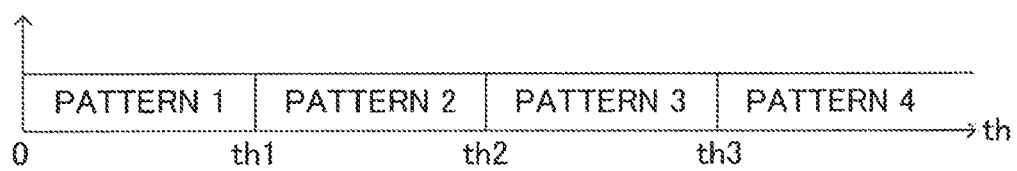
FIG. 4 is a description diagram showing a pattern switch map using a timer.

The DSECU 10 stores a pattern switch map to switch the sounding patterns. FIG. 4 shows one example of the pattern switch map. The horn timer th is incremented at the step S18 every time the predetermined calculation interval elapses, and therefore the horn timer th represents the elapsed time since the horn 92 starts sounding. Hence, the sounding pattern is switched, depending on the elapsed time since the horn starts sounding. In the pattern switch map shown in FIG. 4, the pattern 1 is set in a period during which the value of the horn timer th is more than or equal to 0 and less than a first threshold value th1 (0≤th<th1), the pattern 2 is set in a period during which the value of the horn timer th is more than or equal to the first threshold value th1 and less than a second threshold value th2 (th1≤th<th2), the pattern 3 is set in a period during which the value of the horn timer th is more than or equal to the second threshold value th2 and less than a third threshold value th3 (th2≤th<th3), and the pattern 4 is set in a period during which the value of the horn timer th is more than or equal to the third threshold value th3 (th3≤th).

Therefore, the sounding pattern is set in such a manner that the ratio of the sounding time of the horn 92 per unit time decreases with the time elapsed since the horn 92 starts sounding.

The DSECU 10 outputs the sounding instruction of the horn 92 to the body ECU 90 in accordance with the set sounding pattern. Accordingly, the electric actuator of the horn 92 is energized, and the horn 92 raises the warning sound in accordance with the sounding pattern.

The DSECU 10 determines, at a subsequent step S21, whether or not a cancel condition is satisfied. This cancel condition is satisfied when some predetermined operation is performed after the vehicle has stopped. For example, the cancel condition is satisfied when the operation of the confirmation button 19, the operation of turning off the ignition switch, and so on are detected.

The DSECU 10 performs the driver abnormality notification control routine every time the predetermined calculation interval elapses while the cancel condition is not satisfied. Accordingly, the value of the horn timer th increases. Therefore, the sounding pattern switches in the order of the pattern 1, the pattern 2, the pattern 3, and the pattern 4 with the time elapsed since the horn 92 starts sounding. Thereby, the ratio of the sounding time of the horn 92 per unit time decreases with the time elapsed since the horn 92 starts sounding.

As a result of repeating the processes stated above, when the driver is rescued, and the cancel condition is satisfied (S21: Yes) by the predetermined cancel operation, the DSECU 10 proceeds to a step S22 to terminate the driving control under the abnormal state and the horn sounding control. The DSECU 10 terminates the driver abnormality notification control routine after performing the process of the step S22. The driver abnormality notification control routine will be resumed when the ignition switch is turned on again.

According to the driving support apparatus of the present embodiment described above, when the driver's abnormal state has been detected, the own vehicle is decelerated to stop by the driving control under the abnormal state, and surrounding people are notified of the abnormality occurrence by the sounding of the horn 92. When the driver's abnormal state has been detected, it is required to notify surrounding people of the abnormality occurrence as soon as possible. Especially, the vehicle speed is high immediately after the abnormal state has been detected, and therefore the need to evacuate surrounding people and other vehicles from the vehicle is high. Hence, notification by the sounding of the horn 92 is important. Thus, the DSECU 10 selects the sounding pattern with a high ratio of the sounding time of the horn 92 per unit time (the pattern 1) at an early stage of the detection of the abnormal state, and notify surrounding people of the abnormality occurrence.

If somebody exists in a region where the sounding of the horn 92 can be heard, he/she is notified that some abnormality has occurred in the vehicle, and the driver can be rescued. However, people may not be always in the region where the sounding of the horn 92 can be heard. Therefore, the sounding of the horn 92 needs to be continued until the driver is rescued. On the other hand, the horn 92 becomes incapable of sounding due to the heat generation when the horn 92 is sounded for a long period of time.

Therefore, the DSECU 10 measures the elapsed time since the horn 92 starts sounding with the horn timer th, and as the elapsed time becomes longer, the DSECU 10 selects the sounding pattern with a lower ratio of the sounding time of the horn 92 per unit time. Accordingly, the heat generation of the horn 92 is suppressed (that is, a cooling period of the horn 92 is increased), and as a result, it becomes possible that the horn 92 does not reach the tolerance limit. Hence, notification with the horn 92 can be continued for a long period of time.

As a result, according to the driving support apparatus of the present embodiment, it becomes possible to properly notify that the driver is in the abnormal state by using the horn 92. Accordingly, a rescue ratio of the driver can be increased.

Modification Example 1 of the Sounding Pattern

Figure 5:
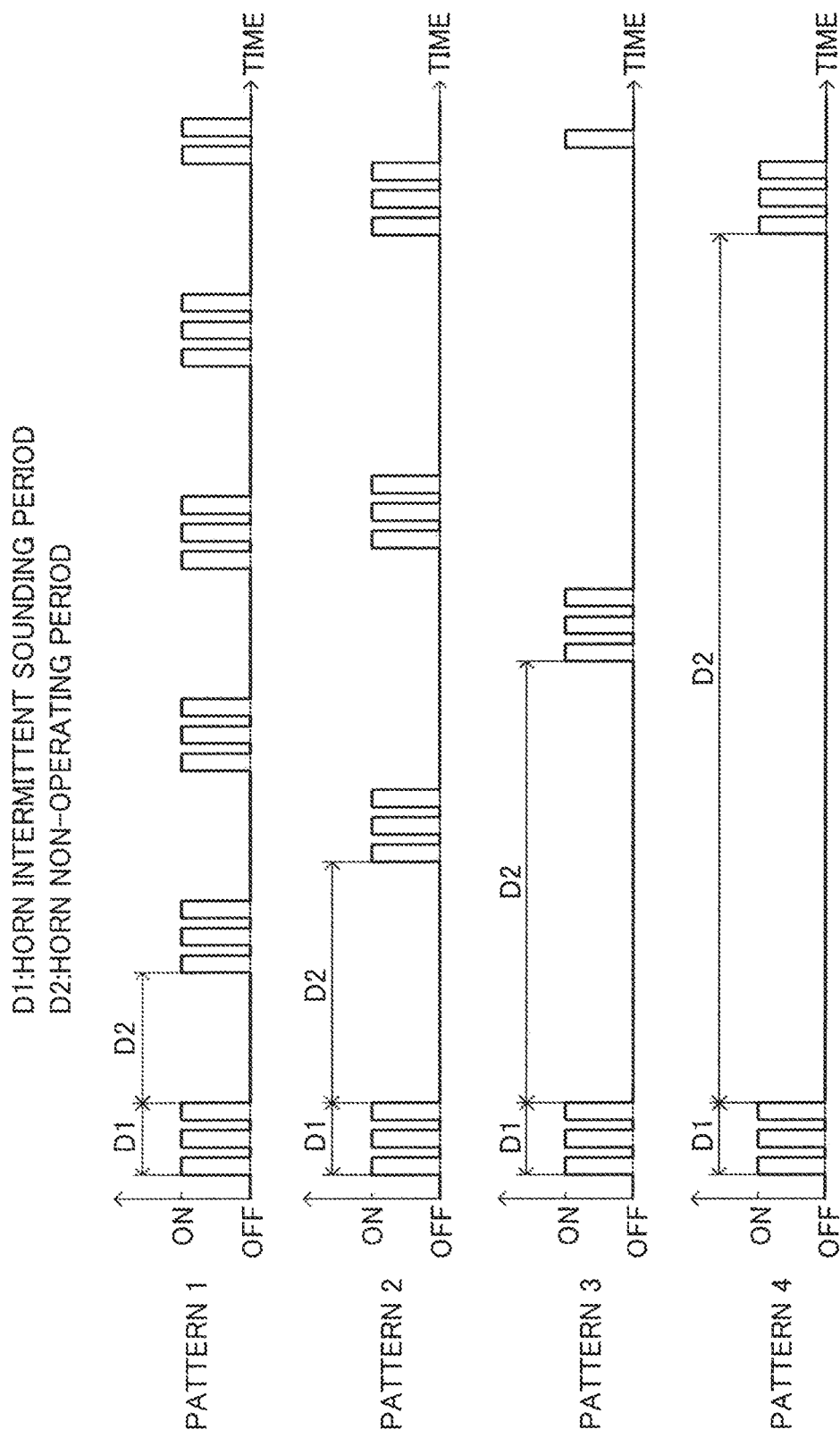
FIG. 5 is a graph showing a modification example 1 of the notification pattern.

Next, a modification example 1 of the sounding pattern will be explained. FIG. 5 shows the modification example 1 of the sounding pattern. In this modification example 1, the horn intermittent sounding period D1 of each of the patterns 1 to 4 is equal, whereas the horn non-operating period D2 of each of the patterns 1 to 4 is different. In this case, the horn non-operating period D2 is set in such a manner that the horn non-operating period D2 is the shortest in the pattern 1, and becomes longer in the order of the pattern 2, the pattern 3, and the pattern 4. Therefore, in this modification example 1, as is the case with the embodiment, the ratio of the sounding time of the horn 92 per unit time decreases with the time elapsed since the horn 92 starts sounding.

Modification Example 2 of the Sounding Pattern

Figure 6:
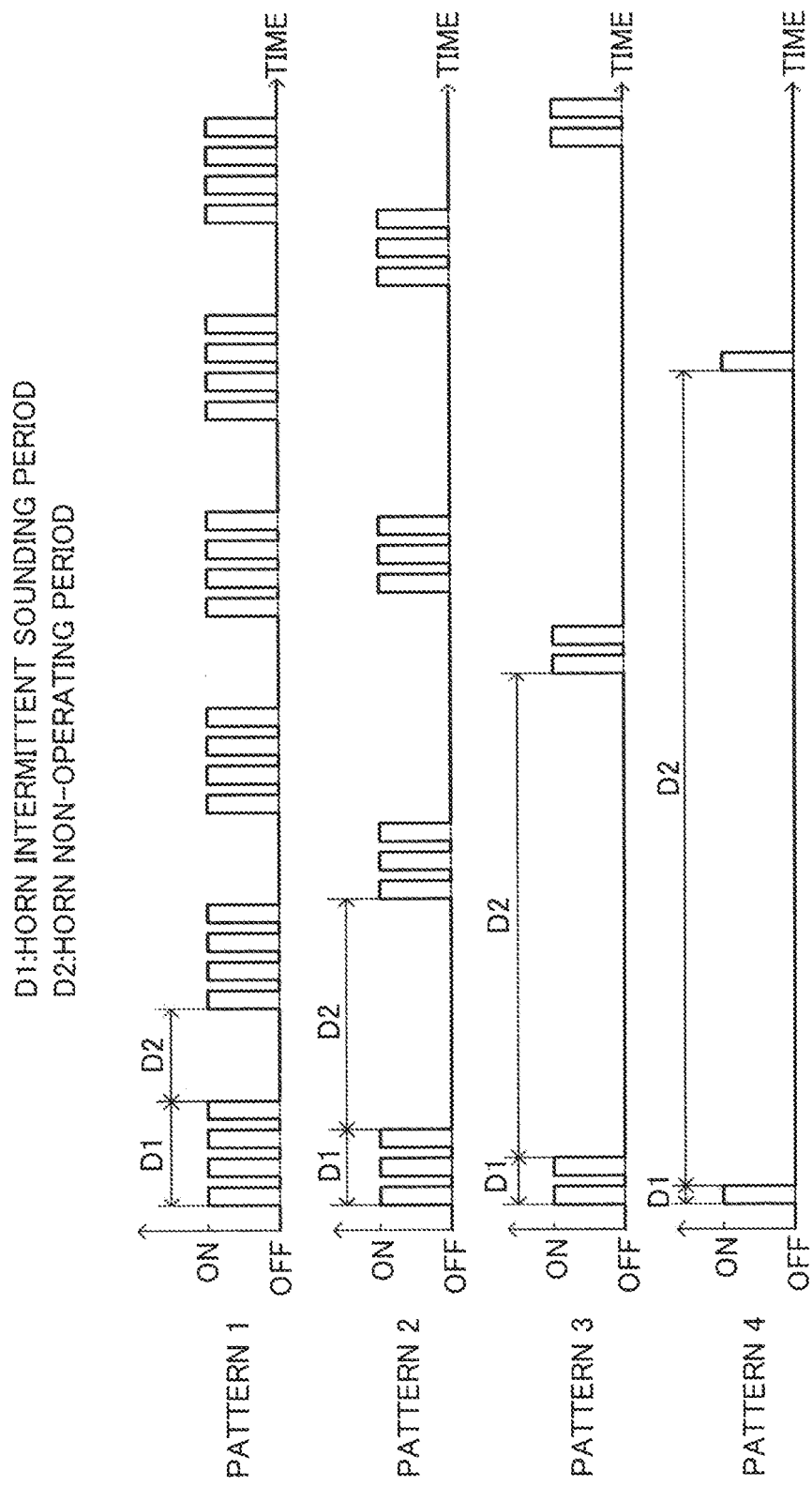
FIG. 6 is a graph showing a modification example 2 of the notification pattern.

Next, a modification example 2 of the sounding pattern will be explained. FIG. 6 shows the modification example 2 of the sounding pattern. In this modification example 2, the number of sounding of the horn 92 in the horn intermittent sounding period D1 is the same as the number of sounding of the horn 92 in the embodiment, whereas, the horn non-operating period D2 is set in such a manner that the horn non-operating period D2 is the shortest in the pattern 1, and becomes longer in the order of the pattern 2, the pattern 3, and the pattern 4. Therefore, in this modification example 2, as is the case with the embodiment, the ratio of the sounding time of the horn 92 per unit time decreases with the time elapsed since the horn 92 starts sounding.

Modification Example 3 of the Sounding Pattern

Figure 7:
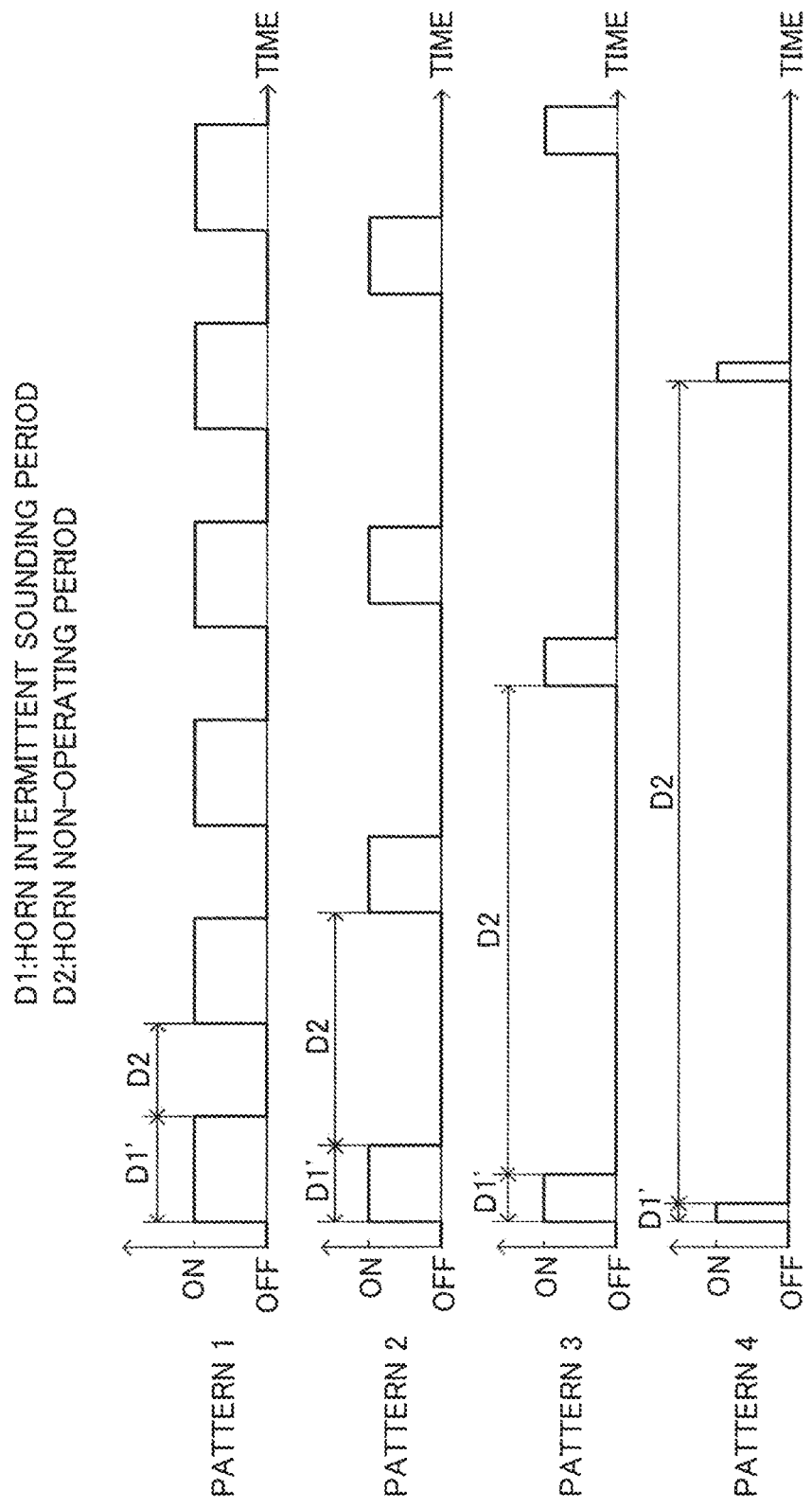
FIG. 7 is a graph showing a modification example 3 of the notification pattern.

Next, a modification example 3 of the sounding pattern will be explained. FIG. 7 shows the modification example 3 of the sounding pattern. In this modification example 3, a horn sounding period D1' showing one successive sounding time of the horn 92 is set in place of the horn intermittent sounding period D1. One cycle of a horn sounding pattern is composed of the horn sounding period D1' and the horn non-operating period D2. The horn 92 sounds intermittently by this horn sounding pattern being repeated.

The horn sounding period D1' is the longest in the pattern 1, and becomes shorter in the order of the pattern 2, the pattern 3, and the pattern 4. On the other hand, the horn non-operating period D2 is the shortest in the pattern 1, and becomes longer in the order of the pattern 2, the pattern 3, and the pattern 4. Therefore, in this modification example 3, as is the case with the embodiment, the ratio of the sounding time of the horn 92 per unit time decreases with the time elapsed since the horn 92 starts sounding.

Modification Example of the Pattern Switch Map

Figure 8:
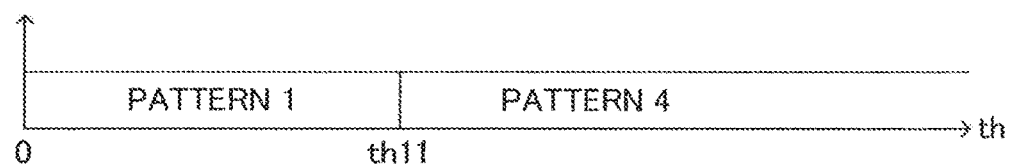
FIG. 8 is a description diagram showing a modification example of the pattern switch map using a timer.

In the aforementioned embodiment and the modification examples, there are four types of sounding patterns (the pattern 1 to the pattern 4) as the sounding pattern. However, the number of the sounding pattern may be any, as long as there are more than or equal to two types of sounding patterns. For example, the sounding patterns may be switched between the pattern 1 and the pattern 4 by using the pattern switch map shown in FIG. 8. In this example, the pattern 1 is set in a period during which the value of the horn timer th is more than or equal to 0 and less than th11 ($0 \le th < th11$), and the pattern 4 is set in a period during which the value of the horn timer th is more than or equal to th11 ($th11 \le th$).

Modification Example of the Driver Abnormality Notification Control Routine

Figure 9:
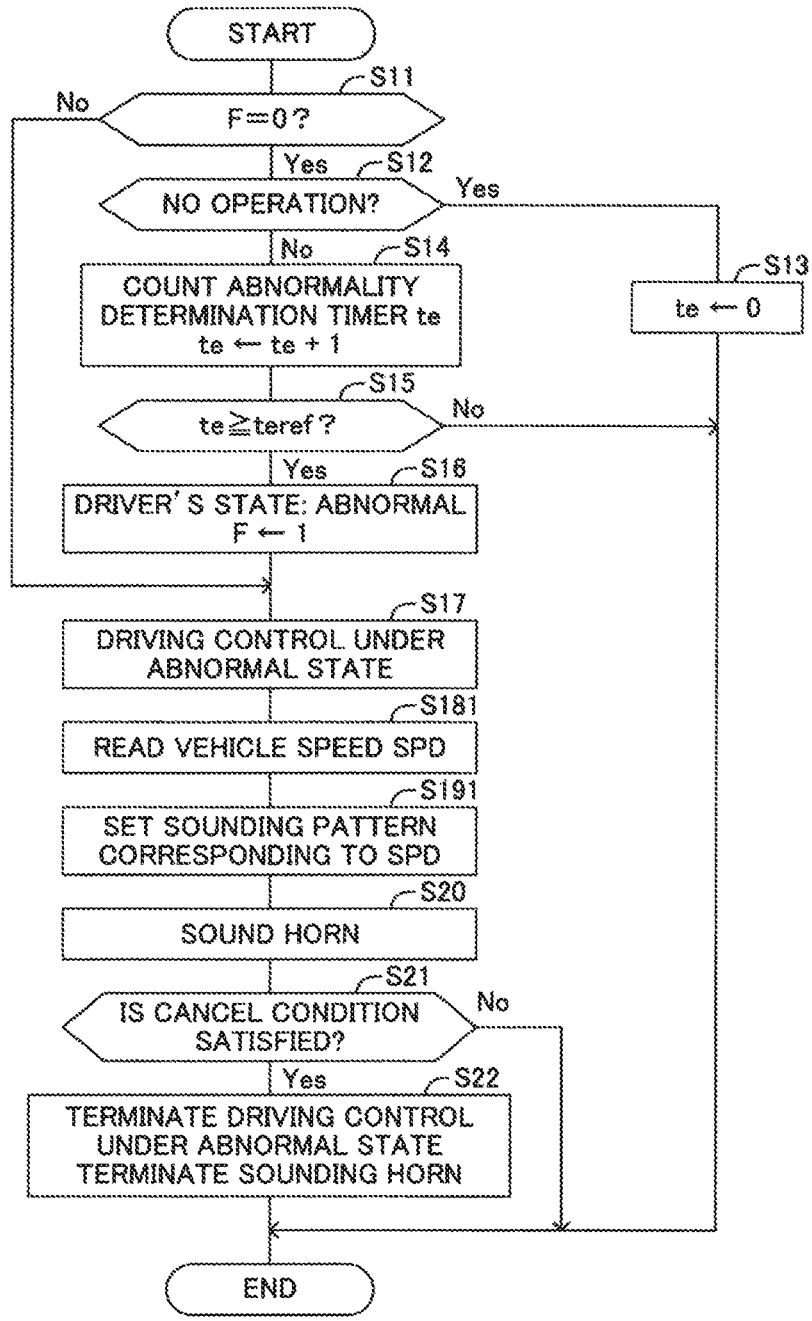
FIG. 9 is a flowchart showing a modification example of the driver abnormality notification control routine.

Next, a modification example of the driver abnormality notification control routine performed by the DSECU 10 will be explained. FIG. 9 shows the modification example of the driver abnormality notification control routine. In the driver abnormality notification control routine of the embodiment (FIG. 2), the following configuration is adopted where the elapsed time since the horn 92 starts sounding is measured by the horn timer th, and the sounding pattern of the horn 92 is switched in accordance with the value of the horn timer th. On the other hand, in this modification example, a configuration where the elapsed time since the horn 92 starts sounding is not measured, and instead, the sounding pattern of the horn 92 is switched based on the vehicle speed of the decelerating own vehicle.

The DSECU 10 repeatedly performs a driver abnormality notification control routine of the modification example (FIG. 9) in place of the driver abnormality notification control routine of the embodiment (FIG. 2) every time the predetermined calculation interval elapses. Hereinafter, regarding processes same as the processes of the embodiment, description will be omitted or only a simple description will be made by adding the same step numbers to FIG. 9. In the driver abnormality notification control routine of the modification example, processes of a step S181 and a step S191 are performed instead of the step S18 and the step S19 in the driver abnormality notification control routine of the embodiment (FIG. 2).

The DSECU 10 sets the abnormality determination flag F to "1" (S16) based on the continuation of the state-with-no-driving-operation, and starts the driving control under the abnormal state at the subsequent step S17. Accordingly, deceleration of the vehicle is started. Next, the DSECU 10 reads, at the step S181, the vehicle speed SPD of the own vehicle detected by the vehicle speed sensor 16. Thereafter, the DSECU 10 sets, at the step S191, the sounding pattern corresponding to the vehicle speed SPD, and outputs, at the step S20, the sounding instruction of the horn 92 to the body ECU 90 in accordance with the set sounding pattern. The sounding pattern is the same as the sounding pattern in the aforementioned embodiment and the modification examples.

The DSECU 10 stores a pattern switch map to switch the sounding pattern. FIG. 10 shows one example of the pattern switch map. The sounding pattern is switched, depending on the vehicle speed SPD. In the pattern switch map shown in FIG. 10, the pattern 4 is set in a period during which the vehicle speed SPD is 0, the pattern 3 is set in a period during which the vehicle speed SPD is greater than 0 and is less than or equal to a first threshold value SPD1, the pattern 2 is set in a period during which the vehicle speed SPD is greater than the first threshold value SPD1 and is less than or equal to a second threshold value SPD2, and the pattern 1 is set in a period during which the vehicle speed SPD is greater than the second threshold value SPD2.

The own vehicle is forcibly decelerated by the driving control under the abnormal state. Therefore, the sounding pattern is set in such a manner that the ratio of the sounding time of the horn 92 per unit time decreases with the time elapsed since the horn 92 starts sounding, and after the vehicle has stopped, the pattern 4 which has the smallest ratio of the sounding time of the horn 92 per unit time is maintained.

According to the modification example of the driver abnormality notification control routine, as is the case with the embodiment, the heat generation of the horn 92 is suppressed (that is, a cooling period of the horn 92 is increased), and as a result, it becomes possible that the horn 92 does not reach the tolerance limit. Hence, notification with the horn 92 can be continued for a long period of time. As a result, it becomes possible to properly notify that the driver is in the abnormal state by using the horn 92. Accordingly, a rescue ratio of the driver can be increased.

Modification Example of the Pattern Switch Map

In the aforementioned modification example of the driver abnormality notification control routine, there are four types of sounding patterns (the pattern 1 to the pattern 4) as the sounding pattern. However, the number of the sounding pattern may be any, as long as there are more than or equal to two types of sounding patterns. For example, the sounding patterns may be switched between the pattern 1 and the pattern 4 by using the pattern switch map shown in FIG. 11. In this example, the pattern 4 is set in a period during which the vehicle speed SPD is 0 (that is, during stoppage of the own vehicle), and the pattern 1 is set in a period during which the vehicle speed SPD is greater than 0 (that is, during the own vehicle traveling while decelerating).

The driving support apparatus comprising the vehicle warning control apparatuses according to the embodiment and the modification examples have been described. However, the present disclosure is not limited to the aforementioned embodiment and modification examples and may adopt various modifications within a scope of the present disclosure.

For example, while the abnormality determination of the driver is performed based on the duration time of the state-with-no-driving-operation in the present embodiment, instead, the abnormality determination of the driver may be performed by using a so-called "driver monitor technique" which is disclosed in Japanese Patent Application Laid-Open (kokai) No. 2013-152700 and the like. More specifically, a camera for photographing a driver is provided on an interior member of a vehicle (for example, a steering wheel, a pillar, and the like). The DSECU 10 monitors a direction of a driver's line of sight or a driver's face direction using the photographed image by the camera. The DSECU 10 determines that the driver is in the abnormal state when the driver's line of sight or the driver's face direction has been in a certain direction for more than or equal to a predetermined time, wherein the certain direction is a direction to which the driver's line of sight or the driver's face direction does not face while driving normally.

In addition, the abnormality determination of the driver may be performed by using the confirmation button 19. More specifically, the DSECU 10 urges the driver to operate the confirmation button 19 by an indication and/or a sound every time a first time elapses, and determines that the driver is in the abnormal state when a state in which the confirmation button 19 is not operated has continued for more than or equal to a second time which is longer than the first time.

Further, the sounding patterns and the pattern switch maps are not limited to the aforementioned embodiment and modification examples, and various types of sounding patterns and pattern switch maps can be adopted.

The invention claimed is:
1. A vehicle warning control apparatus comprising;
   abnormality determination information acquisition means for acquiring an abnormality determination information showing a determination result of whether or not a driver of a vehicle is in an abnormal state where said driver loses an ability to drive said vehicle; and
   horn sounding control means for intermittently sounding a horn which is an alarm of said vehicle based on a determination result that said driver is in said abnormal state, wherein,
said horn sounding control means is configured to control sounding of said horn in such a manner that a ratio of a sounding time of said horn per unit time decreases with a time elapsed since said horn starts sounding.

2. The vehicle warning control apparatus according to claim 1, wherein,
said horn sounding control means is configured to measure an elapsed time since said horn starts sounding, and to decrease said ratio of said sounding time of said horn per unit time as said elapsed time measured increases.

3. The vehicle warning control apparatus according to claim 1 further comprising decelerating control means for decelerating said vehicle based on a determination result that said driver is in said abnormal state, wherein,
said horn sounding control means is configured to acquire a vehicle speed of said vehicle, and to decrease said ratio of said sounding time of said horn per unit time as said vehicle speed acquired decreases.

4. The vehicle warning control apparatus according to claim 3, wherein,
said decelerating control means is configured to decelerate said vehicle until said vehicle stops, and
said horn sounding control means is configured to decrease said ratio of said sounding time of said horn per unit time more when said vehicle stops in comparison with when said vehicle travels while decelerating.

5. The vehicle warning control apparatus according to claim 1, wherein,
said horn sounding control means is configured to;
control sounding of said horn in such a manner that an intermittent sounding period during which said horn is intermittently sounded and a non-operating period during which said horn is not sounded switch alternately, and
decrease a ratio of said intermittent sounding period with said time elapsed.

6. A vehicle warning control apparatus comprising;
a horn which is an alarm of a vehicle; and
an electric control unit operatively connected to the horn, the electric control unit configured to:
acquire an abnormality determination information showing a determination result of whether or not a driver of the vehicle is in an abnormal state where the driver loses an ability to drive the vehicle; and
intermittently sounding the horn based on the determination result that said driver is in said abnormal state; and
control sounding of the horn in such a manner that a ratio of a sounding time of the horn per unit time decreases with a time elapsed since the horn starts sounding.

7. The vehicle warning control apparatus according to claim 6, wherein,
the electric control unit is configured to measure an elapsed time since the horn starts sounding, and to decrease the ratio of the sounding time of the horn per unit time as the elapsed time measured increases.

8. The vehicle warning control apparatus according to claim 6 further comprising:
a brake actuator operatively connected to the electric control unit,
the electric control unit configured to:
control the brake actuator to decelerate the vehicle based on the determination result that the driver is in the abnormal state; and
acquire a vehicle speed of the vehicle, and to decrease the ratio of the sounding time of the horn per unit time as the acquired vehicle speed decreases.

9. The vehicle warning control apparatus according to claim 8, wherein,
the electric control unit is configured to:
control the brake actuator to decelerate the vehicle until the vehicle stops, and
decrease the ratio of the sounding time of the horn per unit time more when the vehicle stops in comparison with when the vehicle travels while decelerating.

10. The vehicle warning control apparatus according to claim 6, wherein,
the electric control unit is configured to:
control sounding of the horn in such a manner that an intermittent sounding period during which the horn is intermittently sounded and a non-operating period during which the horn is not sounded switch alternately; and
decrease a ratio of the intermittent sounding period with the time elapsed.

* * * * *

UNITED STATES PATENT AND TRADEMARK OFFICE
CERTIFICATE OF CORRECTION

PATENT NO. : 9,925,873 B2
APPLICATION NO. : 15/647307
DATED : March 27, 2018
INVENTOR(S) : Masaki Takano Page 1 of 1

It is certified that error appears in the above-identified patent and that said Letters Patent is hereby corrected as shown below:

In the Specification

In Column 9, Line 46, after "deceleration", delete "a" and insert --α--, therefor.

Signed and Sealed this
Fifteenth Day of May, 2018

Andrei Iancu
*Director of the United States Patent and Trademark Office*